April 5, 1927. J. E. NEAHR 1,623,196
TYPEWRITER STAND
Filed Oct. 1, 1921
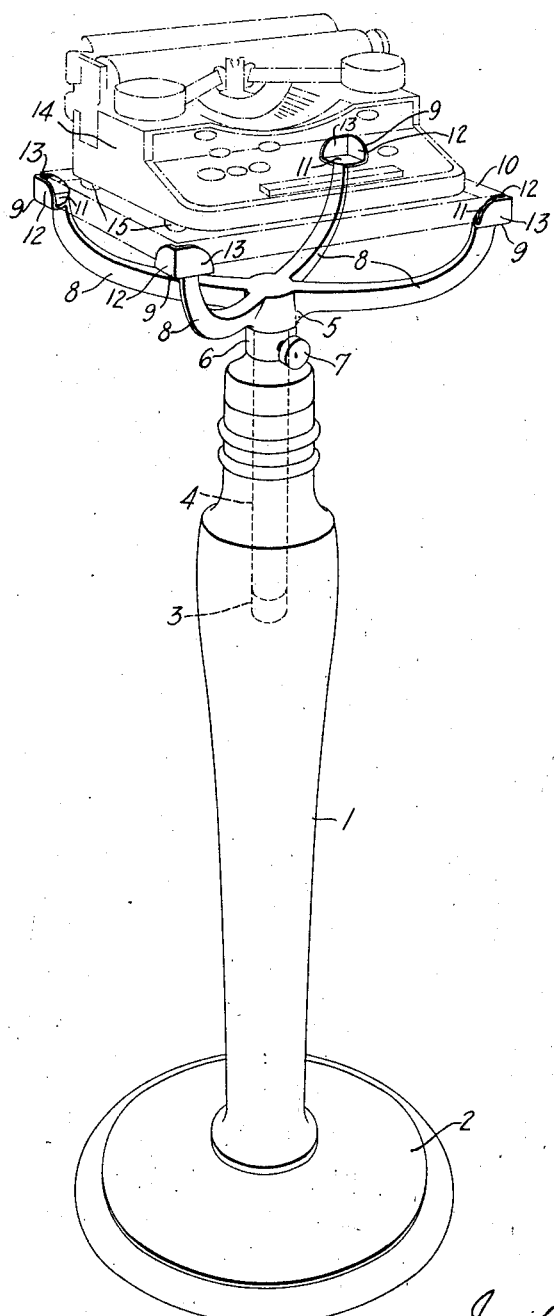

Patented Apr. 5, 1927.

1,623,196

UNITED STATES PATENT OFFICE.

JACOB E. NEAHR, OF HARTSDALE, NEW YORK, ASSIGNOR TO UNDERWOOD TYPEWRITER COMPANY, OF NEW YORK, N. Y., A CORPORATION OF DELAWARE.

TYPEWRITER STAND.

Application filed October 1, 1921. Serial No. 504,687.

The present invention relates to stands for typewriting machines.

An object of the invention is the provision of a stand of a size to occupy a floor space not necessarily greater than the area of the base of a typewriting machine, and of a shape which may be made highly artistic, mainly for display purposes.

The invention is in the nature of a skeleton support (preferably a spider), for such base-boards or platforms, as typewriting machines usually have, and of devices for seating, and holding such platforms against displacement thereon. Another feature of the invention is the provision of means whereby, without moving the standard, or body of the stand, the spider or skeleton platform-support may be turned around a vertical axis with the machine thereon, and may, when desired, be locked against such rotation. Without turning the stand as a whole, and without necessitating change of position on the part of the operator or inspector, the machine may therefore be examined and access thereto be had from all view-points, and it may be fixedly set to be operated or displayed from any angle.

In the preferred form of the invention, the standard or body of the stand is a relatively slender column on the axis of which the machine platform is rotatable.

Other features and advantages will hereinafter appear.

The drawing shows the assembled stand in perspective, with the machine platform and machine thereon indicated in broken lines.

Referring to the drawing, the stand is shown as comprising a columnar standard 1. The column 1 rises from a base-plate 2, shown as a disk, whereby, without lifting, the stand may be rolled from place to place. The diameter of the disk and its weight determine the stability of the stand as a whole, reference being had to the weight and spread of the typewriting machine, in designing the base-plate 2.

The column 1 is shown as solid, but as having a bore 3 to receive a swivel shaft 4 which carries the spider 5. The column 1 may, however, be a hollow casting provided a sufficient bearing is provided at the top thereof for the shaft 4. A collar 6, fixed on the column 1, embraces the shaft 4, and carries a set-screw 7 which passes therethrough to engage the shaft 4 and hold the spider against rotation when the screw is tightened. Upon loosening the screw 7, the spider and machine thereon can be turned to any desired angular position.

The spider has two diametrical crossed arms forming four radial arms or legs 8, each of which terminates in a seat 9, one for each corner of the usual typewriting machine rectangular platform 10. The hub 5, from which depends the rotatable shank 4, joins the diametrical arms 8 where they cross to form the X-shaped spider. The seats or holders 9 are of L-shaped cross-section, both vertically and horizontally. The horizontal wings 11 of the holders lie in a common plane and together serve to support the platform 10. The vertical wings 12 of the holders define the side lines of the platform 10, and the vertical wings 13 of the holders define the front and rear lines of the platform 10; the wings 12 and 13 thus together defining the rectangle in which the platform rests. The machine 14 may have the usual rubber feet 15, or other means by which it is supported and its position on the platform controlled.

Variations may be resorted to within the scope of the invention, and portions of the improvements may be used without others.

Having thus described my invention, I claim:

1. In a stand for typewriters, a standard of small cross-area and adapted to support a typewriting machine between the knees of a typist, said standard being provided with a weighted disc-shaped base of large circular diameter to maintain the standard normally in an upright position and facilitate its movement when slightly tilted by rolling on the periphery of said base, and a mounting for a typewriter baseboard comprising a hub having a spindle rotatable in the upper end of the standard and rigid cross-arms intersecting in the hub in fixed relation to said hub, said arms being curved upwardly toward their outer ends and having at their extremities flanged seats to engage the corners of the baseboard to support the latter and to hold the same against lateral displacement when the standard is tilted.

2. A typewriter machine stand comprising a spider, the arms of which extend upwardly and have at their ends holders with upstanding angular wings to fit around under and on the sides of the corners of a typewriter base board and to prevent lateral displacement of the base board, a standard for supporting the spider above the knees of a typist, there being a swivel connection between the spider and standard with means to rigidly connect the standard and spider, a circular weighted base piece for the standard to stabilize the same also permitting the stand to be rolled from place to place.

JACOB E. NEAHR.